United States Patent [19]

Kurimoto

[11] Patent Number: 4,621,436

[45] Date of Patent: Nov. 11, 1986

[54] POSITION DETECTING APPARATUS

[75] Inventor: Masahiro Kurimoto, Tokyo, Japan

[73] Assignee: Sokkisha Co., Ltd., Tokyo, Japan

[21] Appl. No.: 746,248

[22] Filed: Jun. 18, 1985

[30] Foreign Application Priority Data

Jun. 21, 1984 [JP] Japan .................. 59-128197

[51] Int. Cl.⁴ .............................................. G01B 7/00
[52] U.S. Cl. ..................................................... 33/561
[58] Field of Search ............... 33/169 R, 172 E, 503, 33/558, 561, 572

[56] References Cited

U.S. PATENT DOCUMENTS

| | | | |
|---|---|---|---|
| 4,279,080 | 7/1981 | Nakaya | 33/561 |
| 4,447,958 | 5/1984 | Tanaka | 33/561 |
| 4,530,159 | 7/1985 | Ernst | 33/503 |
| 4,530,160 | 7/1985 | Feichtinger | 33/169 R |
| 4,535,543 | 8/1985 | Linder | 33/169 R |
| 4,547,971 | 10/1985 | Imazeki | 33/169 R |
| 4,549,356 | 10/1985 | Ernst | 33/169 R |

FOREIGN PATENT DOCUMENTS

| | | |
|---|---|---|
| 0068899 | 6/1982 | European Pat. Off. . |
| 3331160 | 3/1985 | Fed. Rep. of Germany . |
| 3234470 | 3/1984 | Fed. Rep. of Germany . |
| 903385 | 8/1972 | United Kingdom . |
| 1348367 | 3/1974 | United Kingdom . |
| 1589297 | 5/1981 | United Kingdom . |
| 2089251 | 6/1982 | United Kingdom . |
| 2094478 | 9/1982 | United Kingdom . |
| 2129133 | 5/1984 | United Kingdom . |

*Primary Examiner*—Richard R. Stearns
*Attorney, Agent, or Firm*—Frishauf, Holtz, Goodman & Woodward

[57] ABSTRACT

A position detecting apparatus for generating a position detection signal when the sensor comes into contact with a workpiece is equipped with a swivel mechanism which allows the sensor to move in any direction within a constant range at the time of contact. This swivel mechanism comprises a metal cylinder for supporting the sensor, a mechanism for moving in the vertical direction guided by a center shaft supported by a swivel bearing, and a mechanism for moving the metal cylinder and center shaft in the horizontal direction. When the sensor contacts the workpiece, a display, for example, is lit up by a position detection circuit.

13 Claims, 5 Drawing Figures

POSITION DETECTING APPARATUS

BACKGROUND OF THE INVENTION

The present invention relates to a position detecting apparatus used for machine tools, such as milling machines, for detecting the position of a reference point on a workpiece.

In the prior art, a reference point for the start of the cutting operation is set on the workpiece and a predetermined cutting pattern is begun from this reference point. A position detecting apparatus is used for setting this reference point. Such a position detecting apparatus is equipped with a conductive sensor 10, which generates a position detection signal when conductive sensor 10 comes into contact with the milling surface of the workpiece, as shown in FIG. 1A.

In order to set the milling reference position using this position detecting apparatus, the apparatus is attached to the cutter shaft of the milling machine. The reference surface of the prepositioned workpiece 11 is placed in contact with sensor 10 of the position detecting apparatus and a position detection signal is output to set the reference scale for the milling machine at zero. After the reference position for the start of the cutting operation is set in this way, the detecting apparatus is removed and the cutter is replaced on the shaft, and milling is begun.

As shown in FIG. 1A, sensor 10 of the position detecting apparatus is vertically supported in relation to milling table 12 by spring 13. Spring 13 is located in the hollow space of metal cylinder 14 which is the support for sensor 10. As shown in FIG. 1B, sensor 10 is able to move slightly horizontally when coming into contact with the workpiece to thereby reduce the shock.

However, sensor 10 receives a shock not only in the horizontal direction, but in the vertical direction as well. The contact portion of sensor 10 has a structure such as that shown in FIG. 1A, and, when workpiece 11 is moved a little too far from the original position, it is very difficult to absorb the shock to sensor 10 in the horizontal direction. In the prior art, this situation often resulted in the position detecting apparatus being damaged by the shock of contact with the workpiece.

SUMMARY OF THE INVENTION

The object of the invention is to provide a position detecting apparatus which can absorb the shock of contact between the sensor and the workpiece in both the vertical and horizontal directions, to reliably prevent damage, when detecting the machining reference position on the workpiece, and which can reliably perform the position detection operation.

The position detection apparatus according to this invention comprises the following:

a conductive sensor for contacting the workpiece;

support means connected to part of the conductive sensor to support it;

swivel mechanism means having a vertical means and a horizontal means such that one end of the support means connected to the conductive sensor is in a stationary position and the other end is movable in both the horizontal and vertical directions, when the conductive sensor comes into contact with the workpiece; and detection circuit means, which becomes a closed circuit when the sensor comes into contact with the workpiece, and outputs a position detection signal.

With a position detecting apparatus having this kind of construction, regardless of whether the sensor is in a vertical or horizontal direction in relation to the workpiece, it is always possible to absorb the shock of contact. Consequently, damage to the apparatus can be reliably prevented.

BRIEF DESCRIPTION OF THE DRAWINGS

This invention may be better understood with reference to the drawings, in which.

DETAILED DESCRIPTION OF THE PREFERRED EMBODIMENTS

Figure 1A:
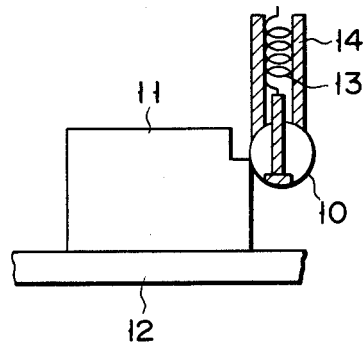
FIGS. 1A and 1B are front cross-sectional views showing a portion of a prior art position detecting apparatus.
Figure 1B:
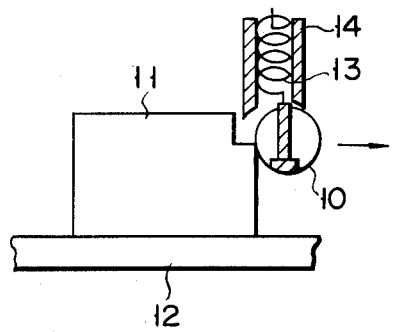
Figure 3:
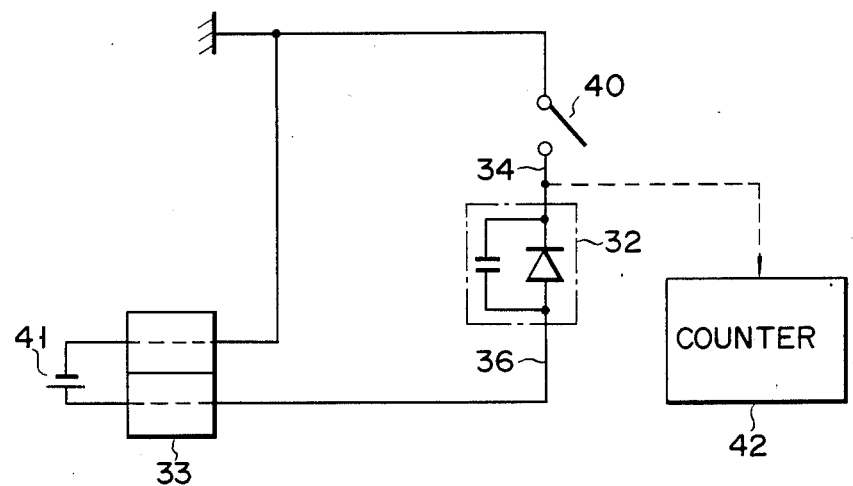
FIG. 3 is an equivalent circuit of the position detection circuit of the above embodiment.
Figure 2:
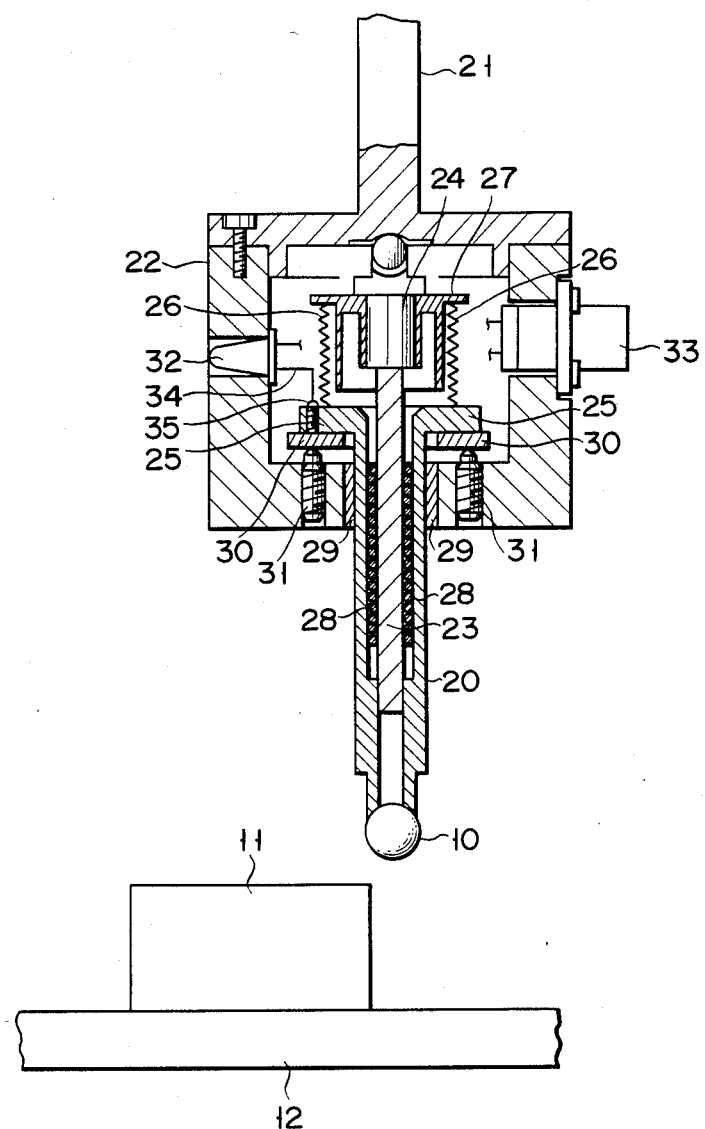
FIG. 2 is a front cross-sectional view of the position detecting apparatus according to the preferred embodiment of this invention.
Figure 4:
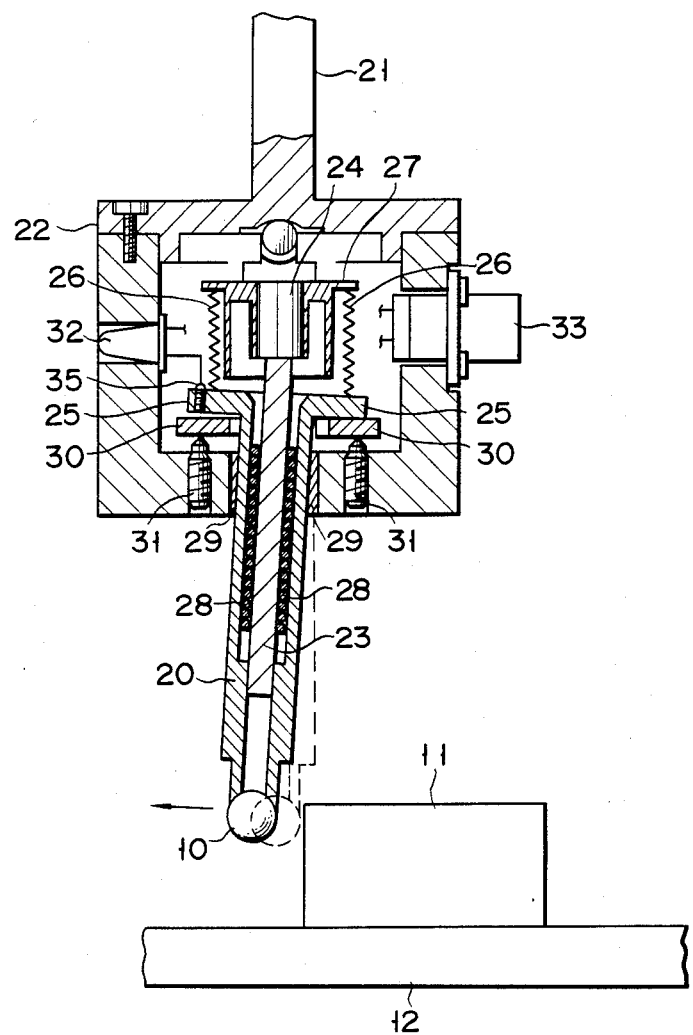
FIG. 4 is a front cross-sectional view of the position detecting apparatus showing the operation.

The following is a description of the preferred embodiment in conjunction with FIGS. 2-4.

As shown in FIG. 2, the position detecting apparatus is equipped with conductive sensor 10, T-shaped metal cylinder 20, housing 22 attached to fixed shaft 21 and a swivel mechanism which supports one end of metal cylinder 20. Sensor 10 is a metal ball whose surface has been ground to high accuracy. The tip of metal cylinder 20 is tapered and follows the contour of part of the surface of sensor 10 to which it is attached. Metal cylinder 20 is supported by a swivel mechanism with the proximal end inside housing 22.

The swivel mechanism has a central shaft 23 in the center of metal cylinder 20, swivel bearing 24 connected to one end of center shaft 23 and spring 26 connected to horizontal section 25 of metal cylinder 20. One end of spring 26 and swivel bearing 24 is fixed to stationary portion 27 inside housing 22. Metal cylinder 20 is movable in the vertical direction with center shaft 23 as the axis via linear ball bearing 28. Center shaft 23 is supported at one end by swivel bearing 24 and is movable in the horizontal direction using swivel bearing 24 as a fulcrum. Elastic member 29 is provided at the attachment site of metal cylinder 20 to housing 22. Part of the side of metal cylinder 20 is supported by the attachment site of housing 22 via elastic body 29. Elastic body 29 makes it possible for metal cylinder 20 to freely move horizontally within a constant range. Horizontal portion 25 of metal cylinder 20 is always pressed by spring 26 against insulating member 30 provided inside housing 22. Insulating member 30 is formed of a hard insulating material, such as a ceramic, and its vertical position is adjusted by adjustment screw 31.

The position detecting apparatus has a circuit for generating a position detection signal when the machining reference position is detected on the workpiece. The position detecting circuit has a display 32 formed of light emitting diodes, for example, and an external connector 33. One terminal 34 of display 32 is connected to part of horizontal portion 25 by connection screw 35. An equivalent circuit of this position detection circuit is shown in FIG. 3.

When sensor 10 comes into contact with workpiece 11, switch 40 shown in FIG. 3 turns on. Then, terminal 34 of display 32 is grounded via sensor 10, workpiece 11, and table 12, as is shown in FIG. 2. In other words, terminal 34 of display 32 is connected to the low level side of power circuit 41 via connector 33, as can be seen in FIG. 3. Terminal 36 of display 32 is normally connected to the high level side of power circuit 41 via connector 33. Counter 42 is also connected to the position detection circuit, and, when switch 40 is turned on, counter 42 is set to zero to indicate the reference position. Counter 42 indicates the position of workpiece 11 digitally as it moves during milling.

The following is a description of the operation of the above embodiment. Stationary shaft 21 (shown in FIG. 2) is attached to the cutter attachment shaft to fix the position detecting apparatus to the milling machine. The position detecting apparatus is set such that metal cylinder 20 is vertical in relation to table 12. Next, when table 12 is moved horizontally and workpiece 11, which is on table 12, comes into contact with sensor 10 at the tip of metal body 20, table 12 stops moving.

In this case, workpiece 11 is moved so that a predetermined reference surface for the start of milling is brought into contact with sensor 10. When sensor 10 contacts workpiece 11, the position detecting circuit turns on switch 40, as shown in FIG. 3. In other words, terminal 34 of display 32 is grounded via metal cylinder 20, sensor 10 and workpiece 11, and a closed circuit connected to the high level side of power circuit 41 via connector 33 is formed. Thus, power voltage is supplied to display 32 which then lights up, indicating the detection of the machining start reference position in regards to workpiece 11. At this time, the position detection signal from the detection circuit is supplied to counter 42 for the digital display of the position of workpiece 11. Counter 42 is set at zero by the position detection signal to indicate the reference position.

When the shock of the contact between sensor 10 and workpiece 11 is transmitted in the vertical direction, this shock causes metal cylinder 20 to move upward guided by center shaft 23. Metal cylinder 20 is smoothly moved upward by linear ball bearing 28 and horizontal portion 25 is lifted off insulation member 30. Then, when sensor 10 separates from workpiece 11, spring 26 pushes metal cylinder 20 back to its original position. That is, metal cylinder 20 is returned to its normal position in contact with insulation member 30.

When the shock of the contact between sensor 10 and workpiece 11 is in the horizontal direction, metal cylinder 20 is angled horizontally and one part of horizontal portion 25 separates from insulation member 30. The inclination of metal cylinder 20 is determined by elastic member 29 of the attachment site of housing 22 and spring 26. Center shaft 23 is supported at one end by swivel bearing 24 so it is angled horizontally in the same direction as metal cylinder 20 in response to movement by metal cylinder 20. Then, when sensor 10 separates from workpiece 11, metal cylinder 20 is returned to its original position by the action of spring 26 and elastic member 29. In other words, horizontal portion 25 contacts insulation member 30 and the tip of metal cylinder 20 on which sensor 10 is provided stably returns to its normal position in the vertical direction. At this time center shaft 23 also returns to its original position together with metal cylinder 20.

In this way, when workpiece 11 contacts sensor 10, a position detection signal is generated from the position detecting circuit. This causes display 32 to light up indicating that the reference position on the workpiece has been detected. Counter 42 for digitally indicating the position of workpiece 11 is set to zero, which indicates the reference position. When the operator of the milling machine has confirmed the detection of the machining reference position by the position detecting apparatus, he removes the apparatus from the cutter shaft and attaches the cutter to begin the machining process from that reference position.

In this detection of the reference position, sensor 10 of the position detection apparatus contacts workpiece 11 and absorbs the shock of contact. Depending on the direction of the contact, metal cylinder 20 moves freely in either the horizontal or vertical direction within a constant range. Metal cylinder 20 moves in the vertical direction guided by center shaft 23 or moves horizontally in response to the action of swivel bearing 24. Accordingly, the shock of contact is absorbed by the free movement in all directions. This consequently reliably prevents damage to sensor 10 and to the area surrounding metal cylinder 20.

What is claimed is:

1. A position detecting apparatus comprising:
   a housing having an opening in a wall thereof;
   a rod received within said opening and having one end tiltably coupled to said housing and its other end projecting from said housing;
   a conductive hollow shaft slidably accommodating said rod therein and having one end inside said housing and another end projecting further from said housing than the other end of said rod, said hollow shaft being movable from a rest position to a second position in which its one end is advanced further into said housing;
   first resilient means coupled between said housing and said hollow shaft for urging said hollow shaft to its rest position;
   means for retaining said hollow shaft in its rest position;
   second resilient means provided in said opening between said housing and said hollow shaft to oppose lateral movement of the hollow shaft;
   a conductive contact element engaging the other end of said hollow shaft; and
   position detection circuit means coupled to said contact element for generating a signal when said element contacts a workpiece.

2. A position detecting apparatus according to claim 1, wherein said conductive contact element is a metal with a ball shape.

3. A position detecting apparatus according to claim 2, wherein said hollow shaft is a hollow metal cylinder the tip of which has a shape corresponding to the shape of said contact element.

4. A position detecting apparatus according to claim 1, wherein said position detection circuit means comprises display means for displaying the position detection when said contact element comes into contact with said workpiece.

5. A position detecting apparatus according to claim 1, further comprising a swivel bearing secured to said housing and connected to the one end of said rod.

6. A position detecting apparatus according to claim 5, wherein said retaining means comprises a flange on the one end of said hollow shaft, said flange being larger than said opening.

7. A position detecting apparatus according to claim 6, further comprising an insulator between said flange and the housing.

8. A position detecting apparatus according to claim 6, wherein said first resilient means is compressed between said swivel bearing and said housing.

9. A position detecting apparatus according to claim 6, wherein said first resilient means is a spring having one end connected to the flange and another end coupled to the housing.

10. A position detecting apparatus according to claim 9, wherein said second resilient means comprises an elastic ring around said hollow shaft.

11. A position detecting apparatus according to claim 9, further comprising a linear bearing between said rod and said hollow shaft.

12. A position detecting apparatus according to claim 1, wherein said second resilient means comprises an elastic ring around said hollow shaft.

13. A position detecting apparatus according to claim 1, further comprising a linear bearing between said rod and said hollow shaft.

* * * * *